Sept. 13, 1955 V. W. HILL 2,717,482
COTTON HARVESTER
Filed June 28, 1950 2 Sheets-Sheet 1
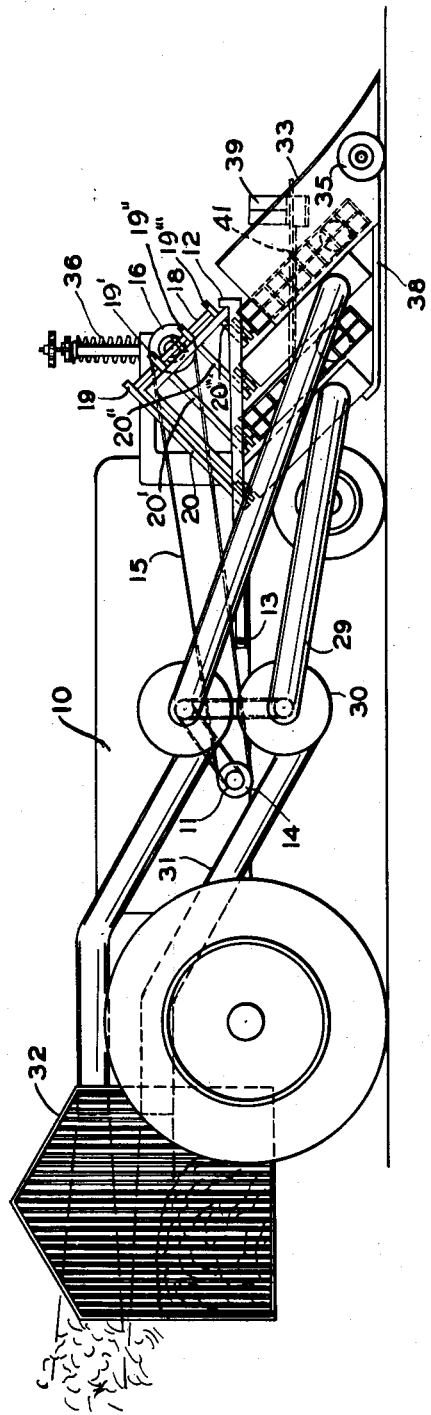
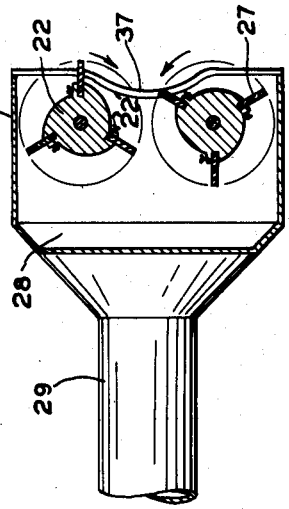
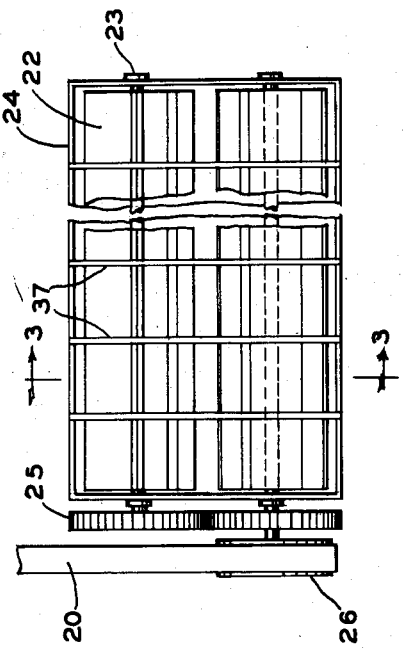
INVENTOR
VERNON W. HILL
BY
ATTORNEY Sept. 13, 1955      V. W. HILL      2,717,482
COTTON HARVESTER
Filed June 28, 1950      2 Sheets-Sheet 2
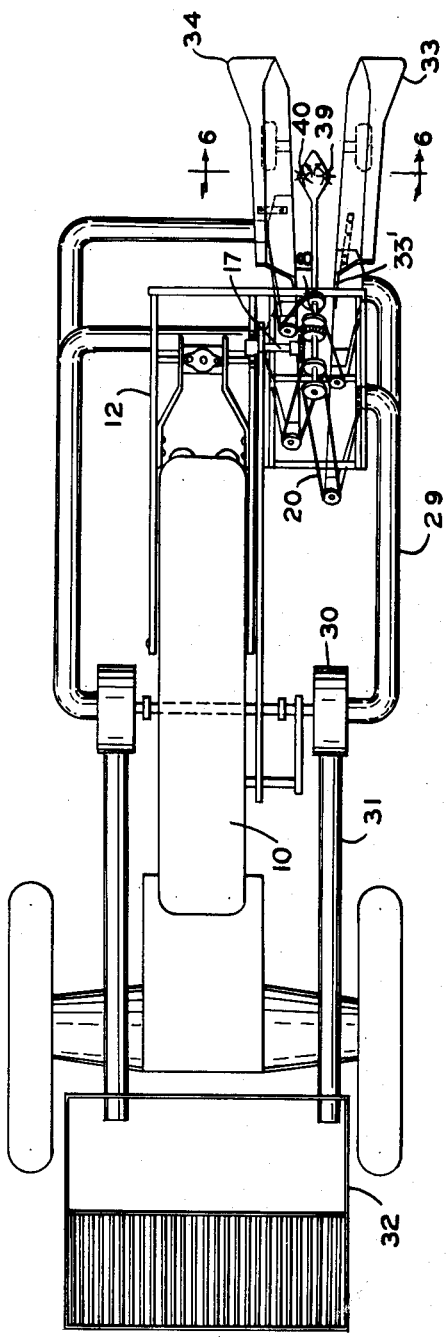
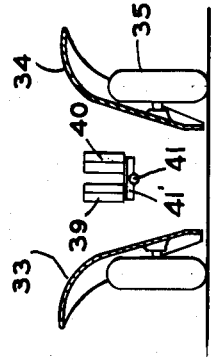
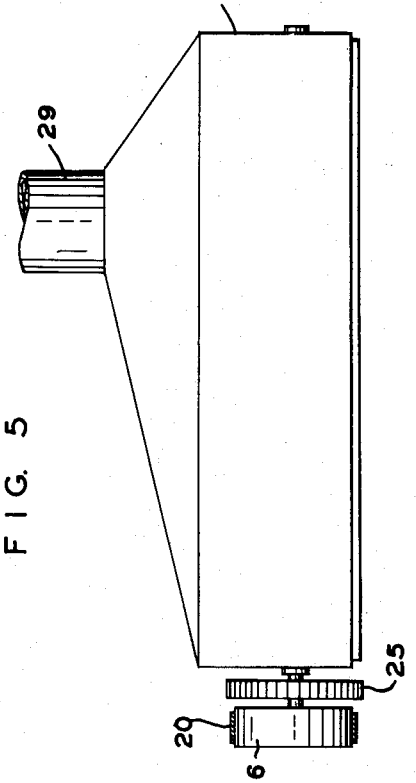
INVENTOR
VERNON W. HILL
BY
ATTORNEY

United States Patent Office 2,717,482
Patented Sept. 13, 1955

2,717,482

COTTON HARVESTER

Vernon W. Hill, Wake Forest, N. C.

Application June 28, 1950, Serial No. 170,927

9 Claims. (Cl. 56—48)

The present invention relates to cotton harvesters generally, and more in particular to a cotton harvester of the type which may be removably attached to a motorized vehicle such as a tractor, truck or the like.

The efficient harvesting of seed cotton from the balls on the stalk of cotton plants in the field has long been a problem which has defied the mechanical genius of mankind. Although the design of many machines has been attempted, none has served to be sufficiently efficient in the field to meet with widespread acceptance. Hand picking is to this date the general practice. Hand operated mechanical devices of the prior art have proved to be of little or no practical value, their operation being too slow and too inefficient to warrant their use. Attempts at automatic or semi-automatic mechanisms have either failed to gather the cotton effectively, leaving much of it in the field, or have so wound up the cotton onto the mechanism that it could not be doffed effectively and without damage to the fiber, or else have gathered an excessive amount of extraneous matter along with the seed cotton.

It is an object, therefore, of my invention to provide an automatic cotton harvester in which the objections to the prior art devices have been obviated.

Another object of the present invention is to provide an improved cotton gathering mechanism adapted for attachment to a motorized vehicle itself, the blades being arranged to wipe the cotton from the boll, and the removed cotton is blown through passageways to a remotely positioned receptacle or container which may also be carried by the vehicle.

Another object of the invention is to provide a cotton harvester of the character described which is provided with a plurality of picker heads, each head carrying a pair of rotating rotors inclined not only rearwardly in the path of travel of the machine, but which also converge inwardly to form a converging throat which gathers the plants for wiping the seed cotton from the bolls.

Another object of the invention is to provide these rotors with wiper blades arranged to rotate in pairs in their respective picking heads, the blades projecting radially from the longitudinal axis of the rotors, the blade of one rotor more or less bisecting the angle formed by two blades on the opposing rotor in a manner simulating the meshing of geared teeth. The blades, however, do not come in contact with each other in their rotation, but sufficient clearance is given to afford a biting action to the seed cotton, as it is brought between two opposing blades, without crushing the seed.

Another object of the invention is to provide separate draft tubes for each picker head and its respective pair of rotors to insure free passage of the cotton, wiped by the rotor blades, to the receptacle provided on the vehicle.

Another object of the invention is to provide such a machine as described wherein the opposed rotors in the picker heads are placed in staggered relationship; that is, the picker heads positioned on one side of the machine are staggered with respect to those positioned on the other side of the machine. Such construction provides a cross-draft and a whipping or swaying of the stalk when the same is being approached by the rotors calculated to loosen the lint in the boll and assist the rotor blades in their wiping action.

A further object of the invention is to provide a pair of metallic gathering arms also inclined rearwardly in the plane of the inclined rotors and converging inwardly to form a throat adapted to simultaneously lift the limbs of the plant stalk and bend them inwardly; and, in cooperation with mechanical spreader means, release them into the path of the rotor blades.

Further objects and advantages of the invention will become apparent during the course of the following detailed description when viewed together with the accompanying drawing in which:

Figure 1 is a side view of an embodiment of my invention in a cotton harvester.

Figure 2 is a fragmentary enlarged elevational view of a pair of rotors mounted in one of the picker heads, showing the manner of rotating the rotors.

Figure 3 is a sectional view taken along lines 3—3 of Figure 2.

Figure 4 is a top view of the invention.

Figure 5 is an enlarged plan view of a picker head on the left side of the plant passageway showing how the draft tube is attached.

Figure 6 is an enlarged sectional view taken on line 6—6 of Fig. 4 showing the manner of mounting the gathering arms.

In the drawing, numeral 10 designates a tractor on which the present invention is mounted. The tractor is of the type having an hydraulic lifting means (not shown) and also a power take-off 11 by which all of the moving parts of the present invention are operated.

The entire harvesting unit is mounted upon a forward yoke 12 mounted on the tractor 10 and pivoted around pivot pins 13. This yoke may be of the type normally used by the tractor and its hydraulic system or may be one specially fabricated or formed to be more suitable for use with the present harvester attachment.

Looped around the power take-off pulley 14 is a drivebelt 15 also encircling a pulley 16 mounted at the forward end of the machine. The pulley is mounted on a shaft 17 for rotating operatively associated bevel gears for the rotation of a main countershaft 18. This main countershaft 18 is provided with spaced pulleys 19, 19', 19" and 19''' which are provided respectively with belts 20, 20', 20" and 20''' for rotating their respective rotors 22 in the manner illustrated in Fig. 2. In this figure, a pair of associated rotors 22 are shown mounted upon shafts 23 journaled in a picking head 24. The upper ends of these shafts are provided with gears 25 enmeshed as shown, one of the shafts being provided with a pulley 26 upon which its driving belt rides. The four pairs of rotors used in the present invention are similarly driven from the same counter-shaft 18 in the manner described above.

Across the open face of the picker heads 24 are spaced rods which serve as limb guards 37. While positioned at right angles across their respective picker heads these limb guards will assume an inclined angle complementary to that formed by the peculiar inclination of the picker head on which they are placed. The angle, of course, will not be sufficient to completely bar the entrance of all branches or limbs of the cotton stalk, but will produce a bumping action as the limbs pass over them assisting in fluffing the boll and placing it in line for the rotor blades.

The rotor body 22 is a more or less cylindrical member provided with shoulders on its longitudinal face to which the wiping blades 27 are affixed by studs 22' in the manner illustrated in Figure 3 of the drawing. These blades are preferably made of hard rubber but may be of any material desired. They extend radially from a central axis and are timed by the gears 25 so that a blade of one rotor substantially enmeshes with two blades of an opposite rotor in the manner of gear teeth. It will be noted that the circles described by the blades of the two rotors do not overlap nor are they tangential to each other. The mounting of the rotors is such that a slight distance is deliberately left between the two described circles so that the flexible blades will not only wipe the lint from the stalk, but apply a sudden flip or push, the centrifugal force of which carries the cotton into a prepared converging area 28 immediately behind the picking head 24. A plan view of the construction of the picking head defining this area is more clearly seen in Figure 5 which illustrates how the rear walls of the head converge into a prepared draft tube 29. This tube 29 is extended along the side of the tractor 10 and to the intake side of a blower 30 having its exhaust side directed into a second tube 31 which is extended toward the rear of the tractor and into a prepared receptacle 32.

The present device incorporates four pairs of rotors and blades, two pair being positioned on each side of the above mentioned picking throat, each pair of rotors being more or less enclosed to form a picking head, the rear walls of which define a space converging area into which the cotton is thrown, or doffed, by centrifugal force, and from which it is taken through tubes to the receptacle at the rear of the machine.

Extended forwardly from the rotors are gathering arms 33 and 34 shaped in the manner as shown in Figures 1, 4 and 6. These gathering arms are also inclined at the same double angle given the rotors, as described above, that is, they are tilted outwardly from bottom to top and they converge from front to rear. In Figure 4 it can be seen that one of these arms 33 extends rearwardly for a distance slightly beyond that of the other arm 34. Such construction permits the cotton stalk being squeezed into the narrowing throat to be suddenly thrown into the path of the first set of rotors which are mounted opposite to the extension 33' provided on the first mentioned gathering arm 33. Not only do these gathering arms force the branches of the stalk inwardly toward the stalk, but they also have a tendency of reaching under the stalk at a point near the forward lower end of the arms and lifting the branches upwardly whereby the seed cotton may be wiped from the bolls by the rotating wiper blades. Such combined action is not found in machines of the prior art.

It will be noted that the gathering arms are also provided with wheels 35 adapted to follow the contour of the ground, the rough places being smoothed out by means of a spring shock absorber 36 with which the tractor is equipped or which may be made especially for the present invention. At the end of a row, or when transporting the device, the entire attachment may be raised by means of the yoke 12 on which it is mounted, using the hydraulic system of the tractor for lifting purposes. Each of the gathering arms 33 and 34 is provided with a bottom shoe 38 arranged as a guard for preventing rocks, clods of dirt or other foreign matter from catching on the lower end of the picking heads or otherwise causing injury to the free travel of the machine.

Mounted between the gathering arms 33, 34 and arranged for cooperation with said arms and the wiper blades, are a pair of vertically disposed spreaders 39, 40 which are powered by a flexible shaft 41 connected from the harvester drive shaft to the gear box 41' beneath the spreaders to rotate the spreaders in the direction shown in Figure 4. Each spreader is provided with a plurality of radially extending arms or blades, as seen in Fig. 4, which serve to divide the limbs of the cotton stalks centrally and to spread them more evenly along the gathering arms for more effective harvesting by the wiper blades.

The fact that the gathering arms and the rotors are inclined cannot be overemphasized. Such construction produces a simultaneous scooping, gathering and whipping action not heretofore known or described in the prior art. The staggered picking heads have the further advantage of providing a clear opening on opposite sides for the free passage of air through the picking heads and into the respective suction tubes. It will also be remembered that while the present invention incorporates a separate blower and draft tube for each rotor assembly or picker head, which provides a far greater vacuum than found in former pickers of this general type, this draft alone is not relied upon to remove the cotton from the bolls or to doff the cotton from the rotor blades. In fact, the blades 27 are substantially smooth along their contact edges and are adapted to wipe the cotton from the bolls instead of winding, twisting or pulling it, and the cotton is doffed from the blades by centrifugal force. As the cotton is wiped from the boll it is taken and held in a bite between the rotor blades into the predetermined draft zone of its respective picker head to be picked up in the disposal tubes and blown into the rear container.

While I have illustrated and described my invention in a very practical embodiment thereof without attempting to illustrate or describe other embodiments and adaptations which I contemplate, it will be obvious to those skilled in the art that various changes and adaptations may be made without departing from the scope of my invention as defined in the following claims.

I claim:

1. In a machine to be moved along the ground for harvesting seed cotton from the bolls on the limbs of cotton stalks, the direction of movement of said machine being designated as forward, said machine comprising wiper means for wiping seed cotton from the bolls, said wiper means including means to bite the seed cotton to hold it while imparting a rotary motion thereto and to release said bite to doff said seed cotton in a predetermined zone, characterized by the fact that said wiper means comprise groups of elongated rotary wipers arranged in outwardly divergent relation to one another, said rotary wipers being inclined rearwardly to present a low forward end.

2. In a machine to be moved along the ground for harvesting seed cotton from the bolls on the limbs of cotton stalks, the direction of movement of said machine being designated as forward, said machine comprising wiper means for wiping seed cotton from the bolls, said wiper means including means to bite the seed cotton to hold it while imparting a rotary motion thereto and to release said bite to doff said seed cotton in a predetermined zone, characterized by the fact that said wiper means comprise groups of elongated rotary wipers arranged in both forwardly and outwardly divergent relation to one another, said rotary wipers being inclined rearwardly to present a low forward end.

3. In a machine to be moved along the ground for harvesting seed cotton from the bolls on the limbs of cotton stalks, the direction of movement of said machine being designated as forward, said machine comprising opposed wiper means for wiping seed cotton from the bolls, said wiper means including means to bite the seed cotton to hold it while imparting a rotary motion thereto and to release said bite to doff said seed cotton in a predetermined zone by centrifugal force, characterized by the fact that said wiper means comprise groups of elongated rotary wipers arranged in outwardly divergent relation to one another, said rotary wipers being inclined rearwardly to present a low forward end, opposed groups of said rotary wipers being staggered.

4. In a machine to be moved along the ground for harvesting seed cotton from the bolls on the limbs of cotton stalks, the direction of movement of said machine being designated as forward, said machine comprising wiper means for wiping seed cotton from the bolls, gathering means positioned ahead of said wiper means for folding the limbs of the plant toward the stalk, said wiper means including means to bite the seed cotton to hold it while imparting a rotary motion thereto and to release said bite to doff said cotton in a predetermined zone, characterized by the fact that said wiper means comprise groups of elongated rotary wipers arranged in outwardly divergent relation to one another, said rotary wipers being inclined rearwardly to present a low forward end, and rotary spreader means mounted on said machine and positioned between said gathering means to assist said gathering means in directing said seed cotton into proximity to said rotary wipers.

5. In a machine to be moved along the ground for harvesting seed cotton from the bolls on the limbs of cotton stalks, the direction of movement of said machine being designated as forward, said machine comprising a plurality of elongated rotary wipers arranged in opposed relationship to form a passageway for the passage of cotton stalks therethrough, said wipers being tilted backward to present a low forward end, said wipers also being inclined outwardly from the longitudinal axis of said passageway and arranged in pairs, pairs of said wipers on opposite sides of said passageway being staggered.

6. In a machine to be moved along the ground for harvesting seed cotton from the bolls on the limbs of cotton stalks, the direction of movement of said machine being designated as forward, said machine comprising a plurality of elongated rotary wipers arranged in opposed relationship to form a passageway for the passage of cotton stalks therethrough, said wipers being tilted backward to present a low forward end, said wipers also being inclined outwardly from the longitudinal axis of said passageway, said wipers being arranged in pairs, pairs of said wipers on opposite sides of said passageway being staggered, forwardly divergent gathering means mounted on said machine and positioned ahead of said rotary wipers, and rotary spreader means mounted on said machine and positioned between said gathering means to assist said gathering means in directing the seed cotton into proximity to said rotary wipers.

7. In a machine to be moved along the ground for harvesting seed cotton from the bolls on the limbs of cotton stalks, the direction of movement of said machine being designated as forward, said machine comprising a plurality of elongated rotary wipers arranged in opposed relationship to form a passageway for the passage of cotton stalks therethrough, said wipers being tilted backward to present a low forward end, said wipers also being inclined outwardly from the longitudinal axis of said passageway, said wipers being arranged in pairs, pairs of said wipers on opposite sides of said passageway being staggered, each pair of said wipers being encased within a housing, separate draft means attached to each said housing for removing seed cotton therefrom, forwardly divergent gathering means mounted on said machine and positioned ahead of said rotary wipers, and rotary spreader means mounted on said machine and positioned between said gathering means to assist said gathering means in directing the seed cotton into proximity to said rotary wipers.

8. In a machine to be moved along the ground for harvesting seed cotton from the bolls on the limbs of cotton stalks, the direction of movement of said machine being designated as forward, said machine comprising a plurality of elongated rotary wipers arranged in opposed relationship to form a passageway for the passage of cotton stalks therethrough, said wipers being tilted backward to present a low forward end, said wipers also being inclined outwardly from the longitudinal axis of said passageway, said wipers being arranged in pairs, pairs of said wipers on opposite sides of said passageway being staggered, each pair of said wipers being encased within a housing, separate draft means attached to each said housing for removing seed cotton therefrom, forwardly divergent gathering means mounted on said machine and positioned ahead of said rotary wipers, rotary spreader means mounted on said machine and positioned between said gathering means to assist said gathering means in directing the seed cotton into proximity to said rotary wipers, and wheeled supports mounted on said machine for supporting said gathering means.

9. In a machine to be moved along the ground for harvesting seed cotton from the bolls on the limbs of cotton stalks, the direction of movement of said machine being designated as forward, said machine comprising a plurality of elongated rotary wipers arranged in opposed relationship to form a passageway for the passage of cotton stalks therethrough, said wipers being tilted backward to present a low forward end, said wipers also being inclined outwardly from the longitudinal axis of said passageway, said wipers being arranged in pairs, pairs of said wipers on opposite sides of said passageway being staggered, each pair of said wipers being encased within a housing, separate draft means attached to each said housing for removing seed cotton therefrom, forwardly divergent gathering means mounted on said machine and positioned ahead of said rotary wipers, rotary spreader means mounted on said machine and positioned between said gathering means to assist said gathering means in directing the seed cotton into proximity to said rotary wipers, wheeled supports mounted on said machine for supporting said gathering means, and bottom shoes affixed to said gathering means.

References Cited in the file of this patent

UNITED STATES PATENTS

| Number | Name | Date |
|---|---|---|
| 459,622 | Baker et al. | Sept. 15, 1891 |
| 469,568 | Hodge | Feb. 23, 1892 |
| 494,105 | Lispenard | Mar. 21, 1893 |
| 898,893 | Hollingsworth et al. | Sept. 15, 1908 |
| 1,105,235 | Appleby | July 28, 1914 |
| 1,239,767 | Caldwell et al. | Sept. 11, 1917 |
| 2,140,631 | Johnston | Dec. 20, 1938 |
| 2,355,880 | Macha | Aug. 15, 1944 |
| 2,473,315 | Wallace | June 14, 1949 |
| 2,489,963 | Henley | Nov. 29, 1949 |